United States Patent
Blackadder et al.

(10) Patent No.: US 6,264,127 B1
(45) Date of Patent: Jul. 24, 2001

(54) SEAT BELT RETRACTOR

(75) Inventors: David Blackadder, Carlisle; Alan George Smithson, Wetheral; Joseph Patrick Harte, Maryport, all of (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/515,770

(22) Filed: Mar. 1, 2000

(30) Foreign Application Priority Data

Sep. 17, 1999 (GB) .................................................. 9922101

(51) Int. Cl.$^7$ .................................................. B60R 22/28
(52) U.S. Cl. ........................ 242/379.1; 280/805; 280/807
(58) Field of Search ........................ 242/379.1; 280/805, 280/807; 297/475, 478

(56) References Cited

U.S. PATENT DOCUMENTS 5,779,177  7/1998  Kielwein ........................... 242/382.6
5,820,058  10/1998 Hirzel et al. ....................... 242/379.1

FOREIGN PATENT DOCUMENTS 0297537  1/1989  (EP) .
WO96/32303  10/1996  (WO) .

*Primary Examiner*—John Q. Nguyen
(74) *Attorney, Agent, or Firm*—Lonnie Drayer

(57) ABSTRACT

A seat belt retractor has a spool on which seat belt webbing is wound, arranged for rotation about its longitudinal axis, for payout and winding in of seat belt webbing. A torsion bar is coaxial with the spool and has one end fixed to the spool. A ratchet is fixed to the other end of the torsion bar and a toothed wheel is fixed to the spool to rotate with the spool. A pivoting lock bar extends across the length of the spool, having at least one pawl fixed at each end, to engage with the toothed wheel and with the ratchet respectively. The pawl on the spool side is arranged to be weaker than the other pawl so as to shear under a predetermined force to allow the spool to rotate and the torsion bar to twist.

18 Claims, 5 Drawing Sheets

SEAT BELT RETRACTOR

FIELD OF THE INVENTION

The present invention relates to a seat belt retractor having load limiting capability.

BACKGROUND OF THE INVENTION

Load limiting seat belt retractors are used to reduce the effect on a vehicle occupant of forces generated during a crash. They are designed to absorb some of the initial impact forces to minimize injury caused to the vehicle occupant by interaction with the safety restraint itself, for example by sudden impact of the vehicle occupant with the seat belt webbing. In a severe crash the effect of the vehicle occupant's forward momentum being stopped by a relatively narrow band of webbing can cause injuries. The initial forces of a crash on the vehicle occupant have been reduced by load limiting seat belt retractors and particularly those incorporating torsion bars in the seat belt retractor. Torsion bars are connected in the force transmission path and twist under the forces of a crash thus allowing a limited payout of seat belt webbing and dissipating some of the initial energy of the crash pulse. However, they do not break and when the initial peak of the crash pulse is passed, then the torsion bar holds fast and the seat belt retractor locks against webbing payout in the normal way, restraining the vehicle occupant against impact with internal parts of the vehicle.

The ideal load profile of a load limiting seat belt retractor is an initial steep rise in the force of the torque with a smooth transition to a generally flat, i.e. constant force, line. In practice the load profile tends to rise too slowly and to exhibit undesirable peaks and troughs of torque, with the forces rising over an undesirably long period instead of reaching a plateau quickly. This is due to the combination of elastic and plastic deformation exhibited by a torsion bar.

One arrangement to improve the load profile is to introduce shear pins between the spool of the seat belt retractor and the torsion bar. This raises the gradient of the initial part of the force curve due to the additional force needed to shear the pins. The force is dependent upon the rigidity of the pins.

However shear pins are extra components and increase production times and costs. They must be manufactured to close tolerances to produce the desired performance.

DISCUSSION OF THE PRIOR ART

WO 96/32303 A1 shows shear pins in FIG. 1.

U.S. Pat. No. 5,820,058 shows shear pins in FIG. 1.

U.S. Pat. No. 5,779,177 shows a deformable portion in FIGS. 1 to 4.

SUMMARY OF THE INVENTION

The present invention aims to achieve an improved load profile in a load limiting seat belt retractor using less components and at lower cost.

According to the present invention there is provided a seat belt retractor comprising a spool on which seat belt webbing is wound, arranged for rotation about its longitudinal axis, for payout and winding in of seat belt webbing, a torsion bar coaxial with the spool and having one end fixed to the spool, a ratchet fixed to the other end of the torsion bar, a toothed wheel fixed to the spool, to rotate with the spool, a toothed wheel fixed to the spool, to rotate with the spool, a pivoting lock bar extending across the length of the spool, having at least one pawl fixed at each end, to engage with the toothed wheel and with the ratchet respectively, wherein the pawl on the spool side is arranged to be weaker than the other pawl so as to shear under a predetermined force to allow the spool to rotate and the torsion bar to twist.

At the onset of a crash, the lock bar pivots to bring the locking teeth into engagement with the toothed wheel and with the ratchet respectively, thus locking the spool against rotation and against payout of webbing. Thus the vehicle occupant is securely restrained against forward movement at the earliest possible moment in the crash.

As the crash pulse progresses and the forces increase, the force on the locking pawls of the lock bar increases. At a predetermined force level the weaker pawl on the toothed wheel (spool) side of the lock bar shears and allows the toothed wheel, and thus the spool, to rotate under the force of the forward momentum of the vehicle occupant. Rotation of the spool allows limited additional payout of seat belt webbing, and thus a limited additional controlled forward movement of the vehicle occupant, thus reducing the force transferred to the vehicle occupant from the seat belt. Rotation of the toothed wheel allows rotation of one end of the torsion bar while the other end of the torsion bar is held fast by the other, locking, pawl engaging the ratchet. The torsion bar twists under the force of the crash pulse and absorbs some of the energy of the crash, until the force of the crash has dissipated to a level less then that required to twist the bar. At this stage the spool is locked and no further webbing payout occurs.

Optionally more than one shearable tooth is arranged on the spool side pawl and the teeth may shear simultaneously or in staggered arrangement so as to more accurately define the absorbed forces.

The invention has the benefit of bringing double sided locking of the spool into effect at the beginning of a crash pulse in a load limiting seat belt retractor and thus ensuring stronger initial locking of the spool, and a steeper force gradient at the onset of the crash pulse.

The shearable lock bar pawl, on the ratchet, i.e. spool, side of the lock bar is preferably die cast since this method of manufacture allows the load level at which the tooth breaks to be more accurately determined.

On the ratchet side of the lock bar, there may be one or more than one locking tooth on the pawl and these must be strong enough not to shear under the crash forces.

The shearable lock bar pawl may be inherently weaker because of its material or its construction. It may be constructed to be relatively thin or may be weakened by a notch. The design must be such that the fracture load level is repeatable and predictable.

BRIEF DESCRIPTION OF THE DRAWINGS

For a better understanding of the present invention, and to show how the same may be carried into effect, reference will now be made to the accompanying drawings, in which.

DETAILED DESCRIPTION OF THE INVENTION

Figure 1:
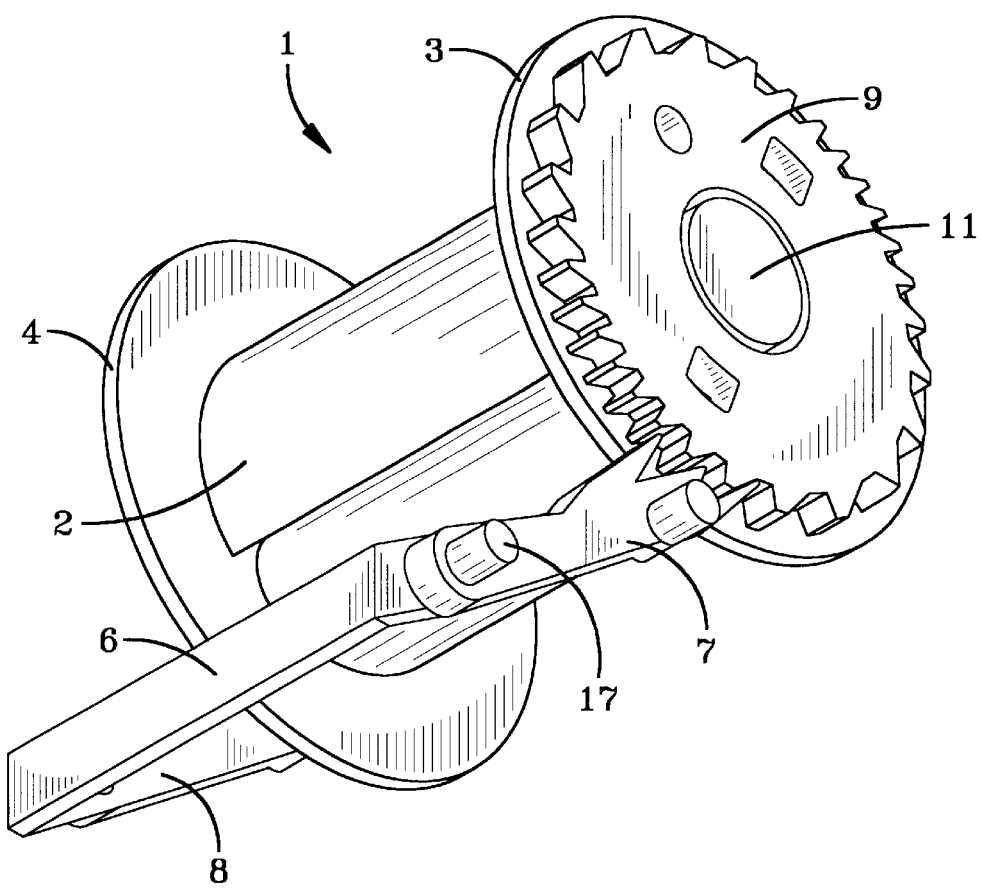
FIG. 1 is a perspective view of a spool for a seat belt retractor according to the present invention, as viewed obliquely from one side and below.
Figure 2:
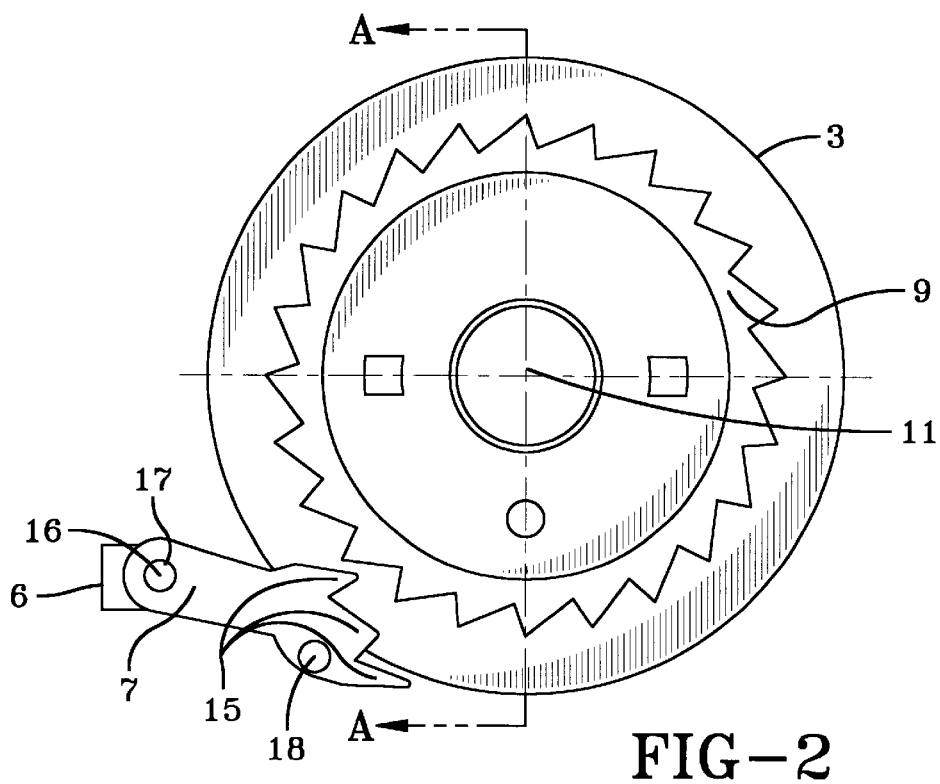
FIG. 2 is a plan view of the spool of FIG. 1 from the same side.
Figure 4:
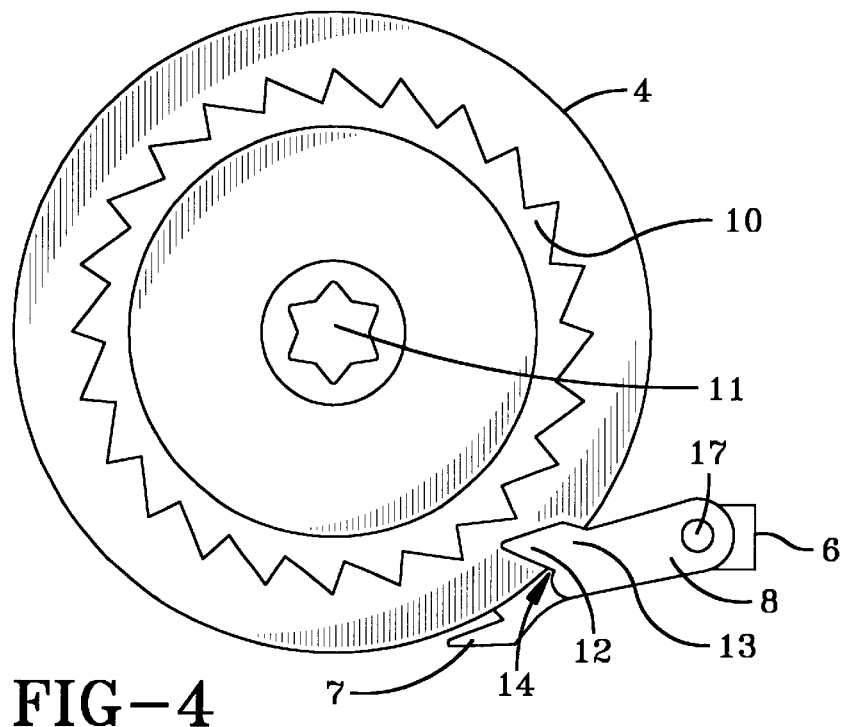
FIG. 4 is a plan view of the spool of FIG. 1, FIG. 2 and FIG. 3 from the side of FIG. 3.
Figure 3:
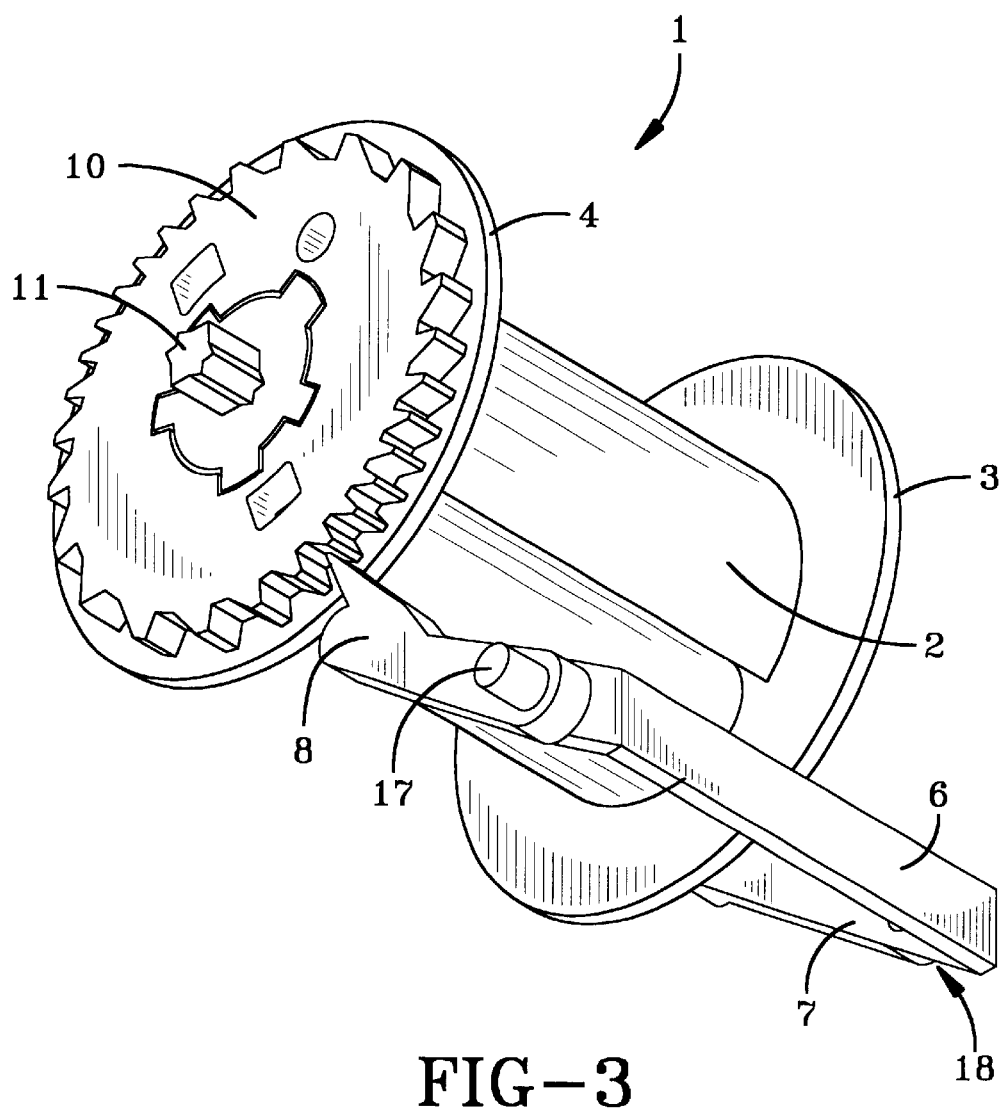
FIG. 3 is a perspective view of the spool of FIG. 1 and FIG. 2 as viewed obliquely from the other side and below.
Figure 5:
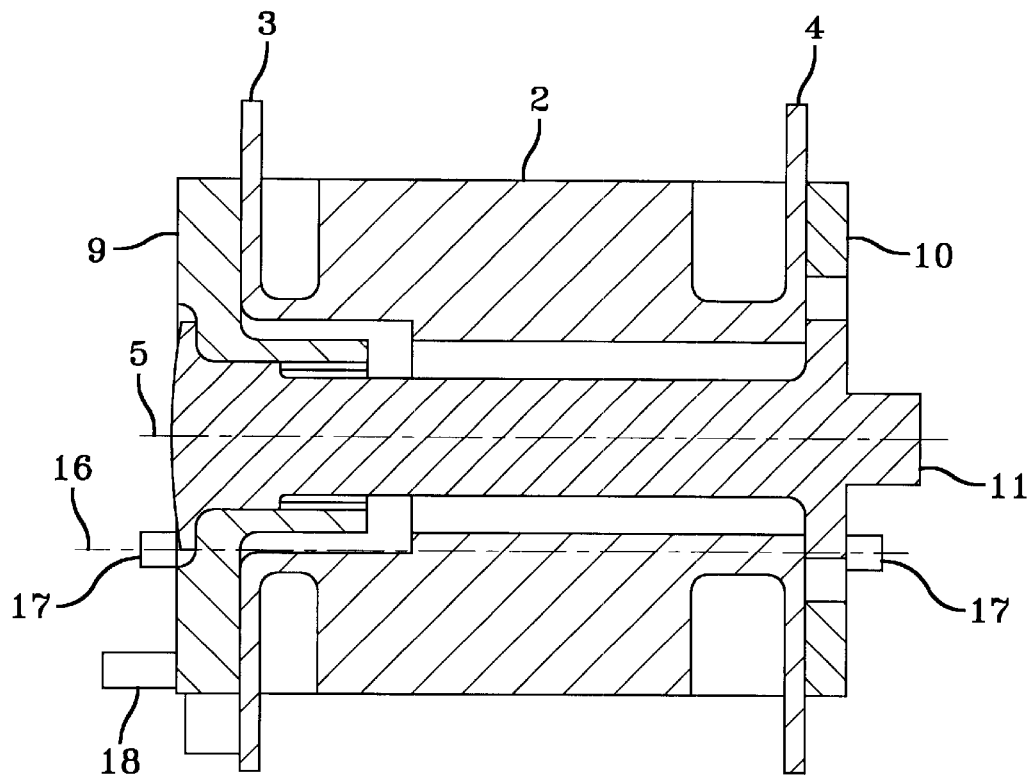
FIG. 5 is a cross-sectional view of the spool of FIG. 1 to FIG. 4 taken along line A—A in FIG. 2.

The figures show a spool 1 of generally known construction comprising a cylindrical body 2 on which is wound seat belt webbing (not shown), and having two opposing end faces 3 and 4. The spool is arranged to rotate about its longitudinal axis 5 (FIG. 5), to pay out and wind in webbing depending upon the direction of rotation. Adjacent a first end face 3 is a peripherally toothed ratchet 9. Adjacent the second end face 4 of the spool is a peripherally toothed wheel 10 which is fixed to or formed integral with the second end face 4 of the spool 1.

A torsion bar 11 extends along the axis of the spool 2. One end of the torsion bar is connected to the ratchet 9 at the first end face 3 of spool 1.

A lock bar 6 extends the length of the spool and is privotally mounted about axis 16. It has a first locking pawl 7 and a second shearing pawl 8, attached at opposite ends. The pawls 7, 8 move with the lock bar 6. Locking pawl 7 has three teeth 15 in the example shown and is arranged to interact with the peripheral teeth of ratchet 9. In the example illustrated, shearing pawl 8 has a single tooth 12, connected to the main body of the shearing pawl 8 by a narrow, relatively weak connecting portion 13 defined by a cut-out 14 in the pawl 8. This cut-out 14 makes the shearing pawl 8 weaker than the pawl 7 since the tooth 12 on pawl 8 is arranged to shear under a predetermined force.

Figure 6:
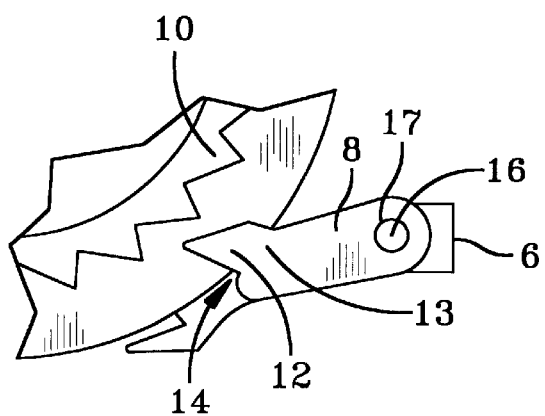
FIG. 6 is an enlarged view of a part of FIG. 4.

The construction of shearing pawl 8 is shown in more detail in FIG. 6. Like parts are denoted by like reference numerals. At opposite ends of the pivotal axis 16 of the lock bar 6 are pins 17 which fits into a corresponding hole or indent on the sides of a retractor frame (not shown) in which the spool is mounted. On the locking pawl 7 is also located a guide pin 18, which acts as a cam follower, fitting into a guiding cam recess on the side of the retractor frame (not shown).

When a sensor detects a crash, either by a webbing or a vehicle sensor (well known in the field, but not shown), the cam follower 18 moves causing the lock bar 6 to pivot and move both the locking pawl 7 and the shearing pawl 8 into engagement with the teeth on the ratchet 9 and on the toothed wheel 10 respectively. This locks the spool 1 against rotation and prevents seat belt webbing payout, thus securing the vehicle occupant. However, when the crash force reaches a predetermined level, the force is sufficient to shear the tooth 12 from pawl 8. This releases the toothed wheel 10 for further rotation and thus releases the spool 1 for rotation and further webbing payout. As the spool 1 rotates the torsion bar 11 twists since it is held fast at its other end by the locking teeth 15 engaging the ratchet 9. When the maximum number of turns of the torsion bar 11 has been reached, or when the crash forces have dissipated below the level needed to twist the torsion bar 11, then rotation of the spool 1 is halted and further webbing payout prevented.

Figure 7:
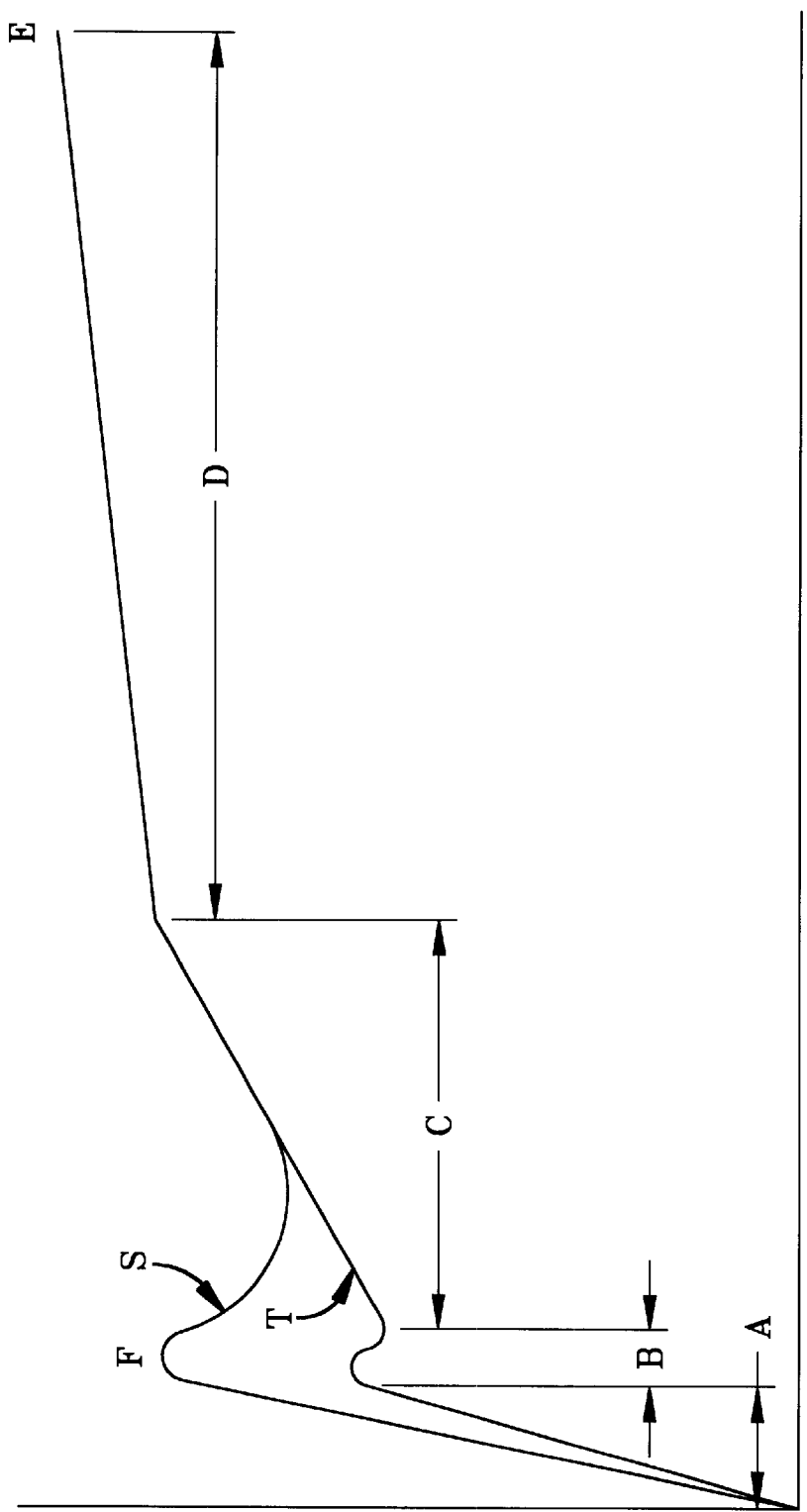
FIG. 7 is a graph showing the relationship of the force of torque to number of turns of the torsion bar.

In FIG. 7 a typical force-time graph, for known torsion bar retractors, is shown by graph T. The new graph produced using apparatus of the present invention is shown by graph S. During the first part of the crash pulse A, the bar 11 deforms elastically and as the deformation increases the force increases proportionally. At section B the material of the torsion bar reaches its yield point and thus the curve dips suddenly. At section C the torsion bar is in a phase of both plastic and elastic deformation. Generally the outer part of the bar 11 will deform plastically and the inner part elastically. The ratio between the area of plastic compared to the area of elastic deformation changes according to the number of turns of the bar 11. At the maximum number of turns the deformation is all plastic, as shown in section D. At point E the deformation is too large and the bar 11 fractures.

In graph s (the present invention) the initial part of the curve is much steeper and reaches a higher level, as shown at point F. This gives a higher restraining force more quickly, which is desirable. In addition, the force across the zones of mixed plastic and elastic deformation is generally increased using a seat belt retractor according to the present invention.

The preferred embodiments have been described herein. It will be apparent to those skilled in the art that the above embodiments may incorporate changes and modifications without departing from the scope of this invention. It is intended to include all such modifications and alterations in so far as they come within the scope of the appended claims or the equivalents thereof.

What is claimed is:

1. A seat belt retractor comprising:
    a spool on which a seat belt webbing is wound, arranged for rotation about a longitudinal axis of the spool, for payout and winding in of seat belt webbing,
    a torsion bar coaxial with the spool and having one end fixed to the spool,
    a ratchet fixed to the other end of the torsion bar,
    a toothed wheel fixed to the spool, to rotate with the spool, and
    a pivoting lock bar extending across the length of the spool, having at least one pawl fixed at each end, to engage with the toothed wheel on a spool side and with the ratchet respectively, wherein the pawl on the spool side is arranged to be weaker than the other pawl so as to shear under a predetermined force to allow the spool to rotate and the torsion bar to twist.

2. The seat belt retractor according to claim 1 wherein the lock bar is arranged to pivot to bring locking teeth of the pawls into engagement with the toothed wheel and with the ratchet thus locking the spool against rotation and against payout of webbing.

3. The seat belt retractor according to claim 2 wherein the shearable lock bar is die cast.

4. The seat belt retractor according to claim 2 wherein more than one shearable tooth is arranged on the toothed wheel side pawl and the teeth are arranged to shear simultaneously.

5. The seat belt retractor according to claim 4 wherein the shearable lock bar is die cast.

6. The seat belt retractor according to claim 4 wherein the toothed wheel is arranged so that the teeth operate in staggered formation.

7. The seat belt retractor according to claim 6 wherein the shearable lock bar is die cast.

8. The seat belt retractor according claim 6 comprising, on the ratchet side of the lock bar, more than one locking tooth on the pawl.

9. The seat belt retractor according claim 4 comprising, on the ratchet side of the lock bar, more than one locking tooth on the pawl.

10. The seat belt retractor according claim 2 comprising, on the ratchet side of the lock bar, more than one locking tooth on the pawl.

11. The seat belt retractor according to claim 1 wherein more than one shearable tooth is arranged on the toothed wheel side pawl and the teeth are arranged to shear simultaneously.

12. The seat belt retractor according claim 11 comprising, on the ratchet side of the lock bar, more than one locking tooth on the pawl.

13. The seat belt retractor according to claim 11 wherein the shearable lock bar is die cast.

14. The seat belt retractor according to claim 11 wherein the toothed wheel is arranged so that the teeth operate in staggered formation.

15. The seat belt retractor according to claim 14 wherein the shearable lock bar is die cast.

16. The seat belt retractor according claim 14 comprising, on the ratchet side of the lock bar, more than one locking tooth on the pawl.

17. The seat belt retractor according to claim 1 wherein the shearable lock bar is die cast.

18. The seat belt retractor according claim 1 comprising, on the ratchet side of the lock bar, more than one locking tooth on the pawl.

* * * * *